RECIPROCAL TEMPERATURE $\frac{1000}{T{\cdot}K}$

INVENTORS,
HANS W. LEHMANN &
MURRAY ROBBINS
BY [signature]
ATTORNEY

FERROMAGNETIC-SEMICONDUCTOR COMPOSITION

INVENTORS
HANS W. LEHMANN &
MURRAY ROBBINS
BY [signature]
ATTORNEY

INVENTORS
HANS W. LEHMANN &
MURRAY ROBBINS
BY [signature]
ATTORNEY

United States Patent Office 3,491,026

Patented Jan. 20, 1970

3,491,026

FERROMAGNETIC-SEMICONDUCTOR COMPOSITION

Hans W. Lehmann, Zurich, Switzerland, and Murray Robbins, Trenton, N.J., assignors to RCA Corporation, a corporation of Delaware Filed June 6, 1967, Ser. No. 643,894
Int. Cl. H01l 3/16; C04b 35/00; C01b 19/00
U.S. Cl. 252—62.3 8 Claims

ABSTRACT OF THE DISCLOSURE

A ferromagnetic-semiconducting material having the molar formula $Cd_{1-x}M_xCr_2Se_{4-y}$ wherein: M is a monovalent or trivalent cation; $x$ is a number from zero to less than one; and $y$ is a number from zero to less than one. The sum, $x+y$, is greater than zero. Preferably, the cations are from Groups I–B and III–A of the Periodic Table and $x$ and $y$ are less than 0.6. A method of preparing the above material comprises the steps of mixing powders of CdSe, Cr, Se, and M in the molar ratio equivalent to the desired product. The mixed powders are pressed into pellets and each pellet is sealed in an evacuated quartz tube. The quartz tube is then heated to a temperature of about 800° C. and held at this temperature for about 48 hours and then cooled to about 600° C. where it is held for an additional 48 hours. The quartz tube is then allowed to cool to room temperature.

BACKGROUND OF THE INVENTION

This invention relates to novel ferromagnetic-semiconductor compositions useful, for example, in microwave devices and magnetic field-effect devices and to a method of tailoring the conductivity of the materials by varying the composition.

$CdCr_2Se_4$ has been reported by P. K. Baltzer et al. in Physical Review Letters 15, 493 (1965) as being a ferromagnetic-semiconducting compound having a relatively high mobility as compared with most ferromagnetic and ferrimagnetic materials. This material has a finite resistivity. It is desirable to be able to tailor the conductivity and the majority carrier type of this material according to the specific application in which it is to be used. For example, for use in most microwave applications, such as microwave limiters, it is preferable to have a high resistivity, low loss material. However, for use in devices such as magnetic field effect transistors or microwave diodes it is desirable that the material be highly conductive.

SUMMARY OF THE INVENTION

It has been discovered that the conductivity of the compound $CdCr_2Se_4$, as well as the majority carrier type, can be tailored by substituting either a monovalent cation or a trivalent cation for a predetermined quantity of the divalent Cd in the compound. The same effect can be achieved by creating a predetermined deficiency of selenium in the compound. These substitutions and/or deficiencies result in a family of compositions that is represented by the formula, $Cd_{1-x}M_xCr_2Se_{4-y}$. In the formula, M is at least one monovalent cation or trivalent cation and $x$ is the number of moles of M cations in the composition that replaces the same number of moles of Cd ion. The molar deficiency of Se ion is represented by the letter $y$. Usually, both $x$ and $y$ are less than 0.6. The pure compound is always p type.

In general, substituting with monovalent ions such as silver or gold ions tends to make the materials more p type and more conductive. Substitution with trivalent ions or creation of a selenium deficiency results in compositions with a lesser p type conductivity or with an n type conductivity. Heating in a selenium atmosphere makes the p type materials more conductive and the n type materials highly resistive.

DESCRIPTION OF THE PREFERRED EMBODIMENTS

Figure 1:
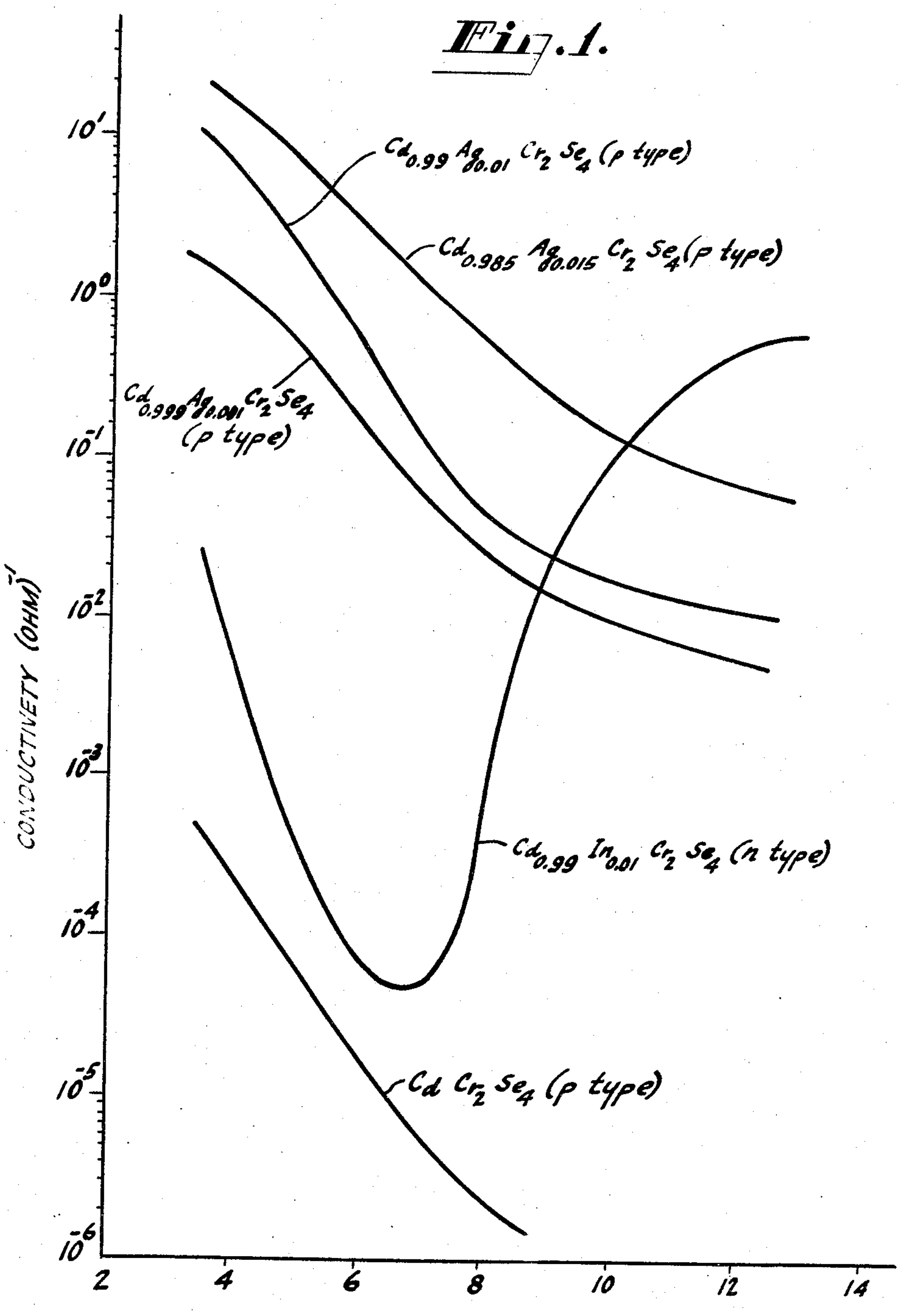
FIGURE 1 is a graphic representation of conductivity as a function of the reciprocal of the ambient temperature. It shows the difference in conductivity between unsubstituted p type $CdCr_2Se_4$ and $CdCr_2Se_4$ in which some of the Cd has been substituted by silver ions or by indium.

Typically, the compound, $CdCr_2Se_4$, is prepared by dry-mixing powders of the starting materials, pressing the mixed powders into pellets and firing the pellets in evacuated quartz tubes. It may be desirable to regrind, press and refire the previously-fired pellets to insure maximum yield. The starting materials are powders of CdSe, Cr, and Se in the molar ratio of 1:2:3, respectively. In order to tailor the conductivity of the $CdCr_2Se_4$, monovalent or trivalent cations are incorporated in the $CdCr_2Se_4$ by substituting them for a portion of the cadmium ions. An alternate method of tailoring the conductivity of $CdCr_2Se_4$ is by heating the $CdCr_2Se_4$ above about 700° C. so as to cause a selenium deficiency in the material. This deficiency can be reversed by reheating the material in a selenium atmosphere at 500° C.

Substitution of the monovalent or trivalent cation is typically accomplished by reducing the molar quantity of the CdSe in the starting material and substituting for this reduced amount an equivalent number of moles of selenium and metal powder. The metal is one that forms monovalent or trivalent ions which are incorporated in the spinel crystal which forms during firing. The resulting ferromagnetic-semiconducting spinel can be represented by the molar formula $Cd_{1-x}M_xCr_2Se_4$ where M is at least one monovalent or trivalent ion and $x$ is the number of moles of M ions used to replace cadmium ions. Generally $x$ should not exceed 0.6. Substitution of any particular ion or group of ions for cadmium is limited by the solubility of the ions in the spinel crystal composition. For example, the solubility of Ag ion is only about 0.03 mole of silver per mole of cadmium chromium selenide. The solubility of In ion, on the other hand, is 0.4 mole per mole of selenide.

Example 1

$Cd_{.99}Ag_{.01}Cr_2Se_4$ is produced by dry milling a mixture of 0.001 mole of silver metal powder, 0.2 mole of chromium metal powder, 0.099 mole of CdSe powder and 0.301 mole of elemental selenium powder for about 18 hours. The mixture is then pressed at a pressure of about 5,000 p.s.i. or more to form a pellet. The pellet is then placed in a quartz tube which is evacuated and sealed. The quartz tube and pellet are then heated slowly (10–15° C./hr.) to a temperature of about 800° C. and are fired at this temperature for 48 hours. Preferably, the temperature is then lowered to about 670° C. and held at this temperature for another 48 hour period. The fired pellet, which is then cooled to room temperature, is composed of single-phase spinel crystals.

Example 2

$Cd_{0.999}Au_{0.001}Cr_2Se_4$ is prepared by dry milling a mixscribed in Example 1 except that the starting material contains 0.001 mole of In powder instead of the Ag powder used in Example 1.

Example 3

$Cd_{0.6}In_{0.4}Cr_2Se_4$ is prepared by dry milling a mixture of 0.04 mole of indium metal powder, 0.2 mole of chromium metal powder, 0.06 mole of CdSe powder and 0.34 mole of elemental selenium powder for about 18 hours. The mixture is then processed as described in Example 1.

Example 4

$Cd_{0.999}Au_{0.001}Cr_2Se_4$ is prepared by dry milling a mixture of 0.0001 mole of gold metal powder, 0.2 mole of chromium metal powder, 0.0999 mole of CdSe powder and 0.3001 mole of elemental selenium powder. The mixture is then processed as described in Example 1.

$CdCr_2Se_4$ and the novel substituted materials can be prepared by techniques other than the one described above. For example, these materials can also be prepared by a vapor transport method or a flux growth method.

The parameters of milling time, pressure for pressing pellets, rate of heating and firing time and temperature are not critical and may be carried out over wide ranges. For example, milling time should be at least about 4 hours for good results but can be less. The pellets can be pressed at any pressure sufficient to give a mechanically stable pellet. Alternatively, it is not necessary to press pellets at all. However, it is then desirable to fire for longer periods of time and/or regrind and refire several times. The rate at which the temperature is raised to the firing temperature is merely a safety precaution to prevent explosion of the ampoule due to the exothermic heat of reaction. The firing temperature is preferably about 700–800° C. and the firing time is preferably at least about 48 hours. If a shorter firing time is used the reaction may be incomplete.

Generally, any method which incorporates the desired ions in $CdCr_2Se_4$ such that these ions are substituted for cadmium ions may be used. The preferred ions employed for tailoring the conductivity of $CdCr_2Se_4$ are those in Groups I–B and III–A of the Periodic Chart.

FIGURE 1 shows the conductivity as a function of temperature for materials having different amounts of silver or indium ions substituted for cadmium ion in $CdCr_2Se_4$. At about room temperature, samples with silver ion substitution have conductivities of from about 1.5 to about 20 $(\text{ohm-cm.})^{-1}$. The silver ions content in these samples of $Cd_{1-x}Ag_xCr_2Se_4$ ranged from about .001 mole to .015 mole. At the same temperature, a sample containing .01 mole of indium ion $$(Cd_{.99}In_{.01}Cr_2Se_4)$$

has a conductivity of about 0.03 $(\text{ohm-cm.})^{-1}$, and unsubstituted $CdCr_2Se_4$ has a conductivity of about 0.0007 $(\text{ohm-cm.})^{-1}$. The conductivity of $CdCr_2Se_4$ can therefore be tailored by controlling the amount and type of monovalent or trivalent ion added in place of cadmium.

Figure 2:
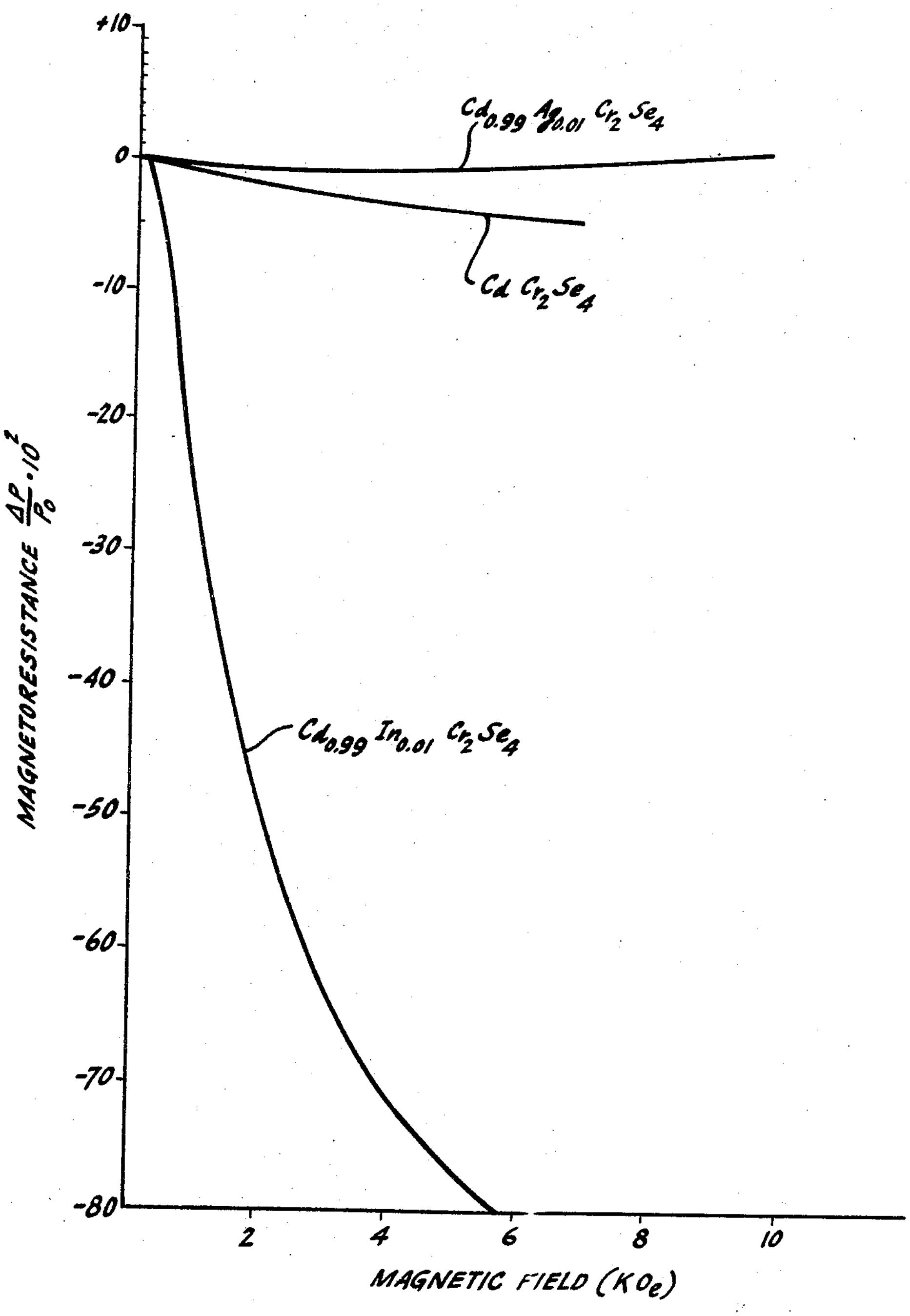
FIGURE 2 is a graphical representation of magnetoresistance as a function of applied magnetic field for unsubstituted $CdCr_2Se_4$ and for indium and silver substituted $CdCr_2Se_4$.

FIGURE 2 shows the effect of ion substitution on the magneto-resistance of $Cd_{1-x}Me_xCr_2Se_4$. When indium ions are substituted for cadmium ions, there is a large change in the magneto-resistance as compared to unsubstituted $CdCr_2Se_4$.

Figure 3:
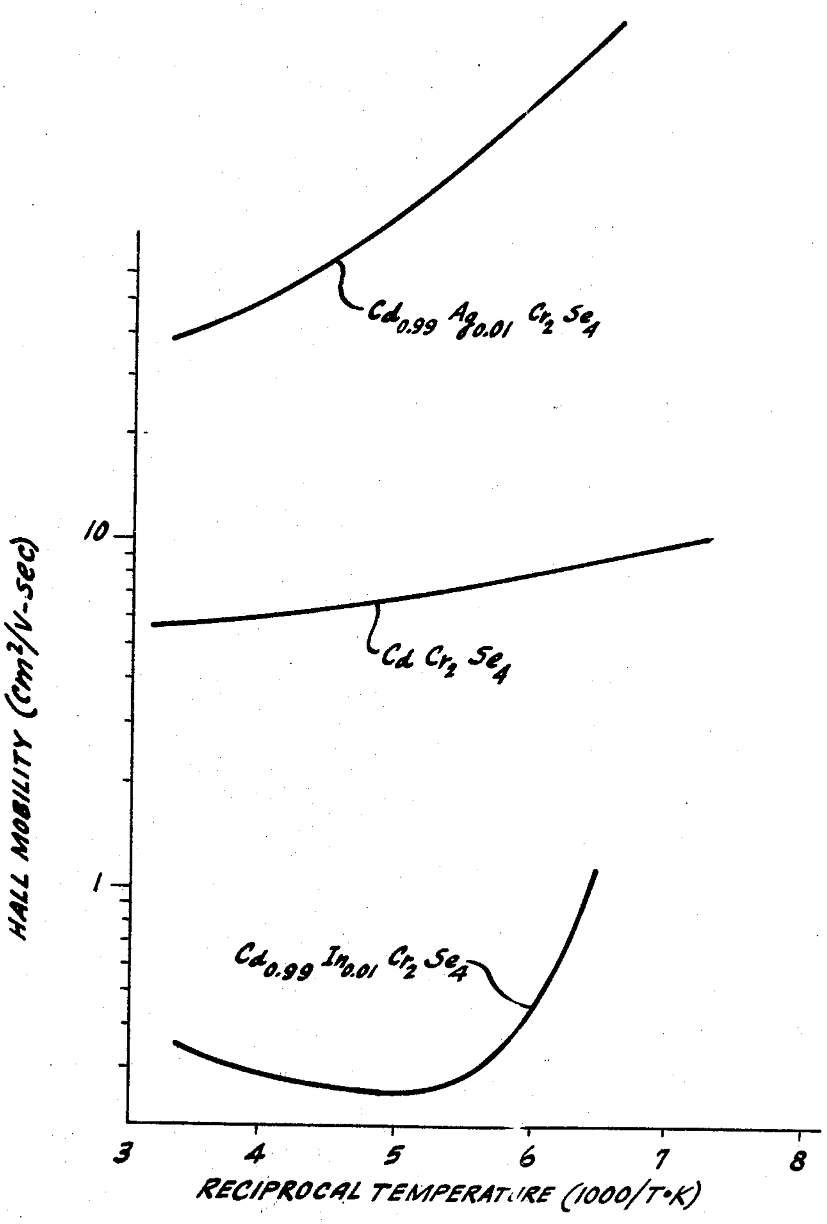
FIGURE 3 is a graphical representation of the change in Hall mobility as a function of the reciprocal of the ambient temperature, showing the effect of ions substitution of the Hall mobility of $CdCr_2Se_4$.

FIGURE 3 shows the effect of ion substitution on the Hall mobility of $Cd_{1-x}M_xCr_2Se_4$. The Hall mobility of unsubstituted $CdCr_2Se_4$ is almost temperature independent whereas it increases rapidly with decreasing temperature for the material containing .01 mole of silver. The Hall mobility for n type $CdCr_2Se_4$ having 0.01 mole of indium substituted for cadmium is very low at high temperatures and rises rapidly when the material becomes ferromagnetic.

It is also possible to dope $CdCr_2Se_4$ by substitution of ions in the chromium and selenium sites. Group V–A and Group VII–A anions have been substituted for a predetermined proportion of selenium ions, and divalent ions of metals in the first row of transition elements have been substituted for a predetermined proportion of chromium ions. For example, the following compounds have been prepared: $CdCr_2Se_{3.99}N_{0.01}$; $CdCr_2Se_{3.99}P_{0.01}$; $CdCr_2Se_{3.99}Br_{0.01}$; $CdCr_{1.99}Co_{0.01}Se_4$; $CdCr_{1.99}Fe_{0.01}Se_4$; and $CdCr_{1.99}Ni_{0.01}Se_4$.

We claim:

1. A ferromagnetic-semiconductor consisting essentially of a material substantially represented by the molar formula $Cd_{1-x}M_xCr_2Se_{4-y}$ wherein (1) M is a cation chosen from the group consisting of silver and indium, (2) $x$ is a number from zero to 0.4, (3) $y$ is a number from zero to less than one, and (4) $x+y$ is greater than zero the value thereof being sufficient to cause said material to have an electrical conductivity different from the conductivity of the compound formed with both $x$ and $y$ are zero.

2. The ferromagnetic-semiconductor described in claim 1 wherein $y$ is less than 0.6.

3. The ferromagnetic-semiconductor described in claim 1 wherein $y$ is essentially zero.

4. A ferromagnetic-semiconductor having a single phase spinel structure represented by the molar formula $Cd_{1-x}Ag_xCr_2Se_4$ wherein $x$ is a number from greater than zero to about 0.03, the value of $x$ being sufficient to alter the electrical conductivity of the compound formed when $x$ equals zero.

5. A ferromagnetic-semiconductor having a single phase spinel structure and represented by the molar formula $Cd_{1-x}In_xCr_2Se_4$ wherein $x$ is a number greater than zero and up to about to about 0.4 such that ferromagnetic-semiconductor is n type.

6. A ferromagnetic-semiconductor represented by the general formula $CdCr_2Se_{4-y}$ and having a spinel crystal structure characterized in that said crystal has a selenium deficiency, represented by $y$, of up to 0.6 moles.

7. A ferromagnetic-semiconductor represented by the formula $Cd_{1-x}Ag_xCr_2Se_4$ wherein $x$ is a number from 0.001 to 0.03.

8. A ferromagnetic semiconductor represented by the formula $Cd_{1-x}In_xCr_2Se_4$ wherein $x$ is a number from 0.01 to 0.4.

References Cited

Lotgering et al.: "Solid State Communications," vol. 5, No. 2 pp. 143–145, February 1967.

Lehmann et al.: "Journal of Applied Physics," vol. 37, No. 3, p. 1389, March 1966.

HELEN M. McCARTHY, Primary Examiner

J. COOPER, Assistant Examiner

U.S. Cl. X.R.

23—315; 252—62.51, 518

CERTIFICATE OF CORRECTION

Patent No. 3,491,026 Dated January 20, 1970

Inventor(s) Hans W. Lehmann and Murray Robbins

It is certified that error appears in the above-identified patent and that said Letters Patent are hereby corrected as shown below:

IN THE SPECIFICATION:

Column 3 Line 3 change "$Cd_{0.999}Au_{0.001}Cr_2Se_4$ is prepared by dry milling a mix-" to --$Cd_{0.99}In_{.01}Cr_2Se_4$ is produced by the same method de- --

Column 4 Line 31 change "with" to --when--

Signed and sealed this 28th day of July 1970.

(SEAL)
Attest:

EDWARD M.FLETCHER,JR.
Attesting Officer

WILLIAM E. SCHUYLER, JR.
Commissioner of Patents